United States Patent [19]

Allen

[11] Patent Number: 4,915,273

[45] Date of Patent: Apr. 10, 1990

[54] BOW AND GUN HOLDERS FOR OFFROAD VEHICLES

[76] Inventor: John M. Allen, 1310 Roosevelt, Silsbee, Tex. 77656

[21] Appl. No.: 314,845

[22] Filed: Feb. 24, 1989

[51] Int. Cl.⁴ .................. B62J 11/00; B60R 7/04; B60R 9/08
[52] U.S. Cl. .................. 224/30 A; 224/913; 224/322; 224/273; 224/281; 24/339; 211/64; 248/248; 248/201; 248/316.4; 269/256; 269/269; 269/254 CS
[58] Field of Search ....... 224/30 A, 42.03 N, 42.03 B, 224/42.45 R, 913, 310, 311, 321, 322, 323, 324, 273, 39, 41, 42.38, 274, 309, 315, 325, 36, 916, 922, 917, 37; 24/338, 339, 555, 567; 248/201, 316.4; 211/64; 280/288.4, 304.5, 769; 269/906, 139, 152, 155, 224, 254 R, 254 D, 254 CS, 256, 266, 269, 270

[56] References Cited

U.S. PATENT DOCUMENTS

| | | | |
|---|---|---|---|
| 593,978 | 11/1897 | Boehm | 224/37 |
| 2,427,365 | 9/1947 | Meister | 269/152 |
| 2,665,598 | 1/1954 | Hardy | 269/224 |
| 3,473,673 | 10/1967 | Porter | 224/913 |
| 4,375,268 | 3/1983 | Speck | 211/64 |
| 4,823,673 | 4/1989 | Downing | 224/30 |

Primary Examiner—Henry J. Recla
Assistant Examiner—James G. Barrow
Attorney, Agent, or Firm—William F. Frank

[57] ABSTRACT

A pair of brackets which can be attached to the handle bars of the ATV or a motorcycle and which will hold a bow or a rifle or shotgun. The brackets include spring-biased U-shaped clamps which can be positioned on a mounting bar, the bar being secured to the handle bars of the ATV or motorcycle or depending on the construction of the rear portion of the ATV or the motorcycle's rear framework thereof, the U-shaped clamps being positioned on the bar in an adjustable manner to accommodate the length of the bow and/or of the weapon to be employed.

9 Claims, 3 Drawing Sheets

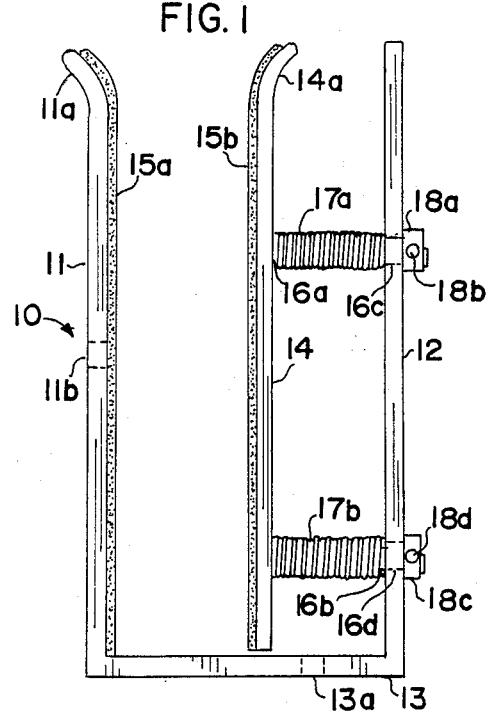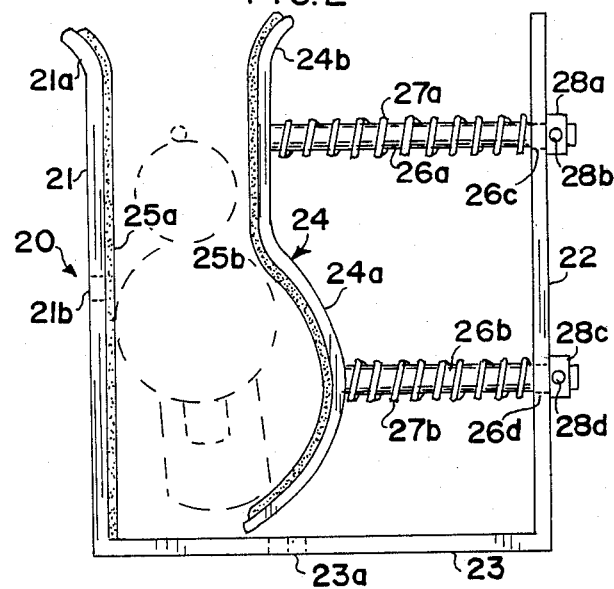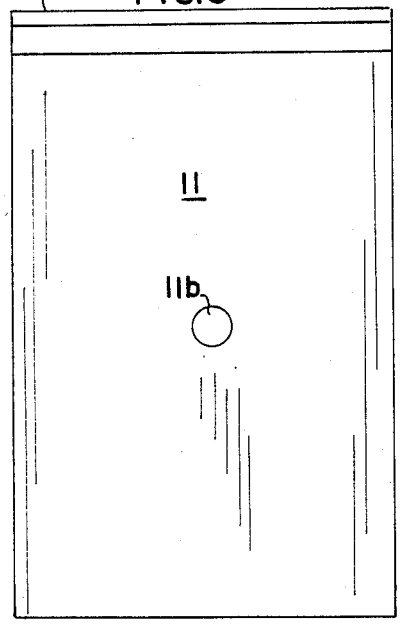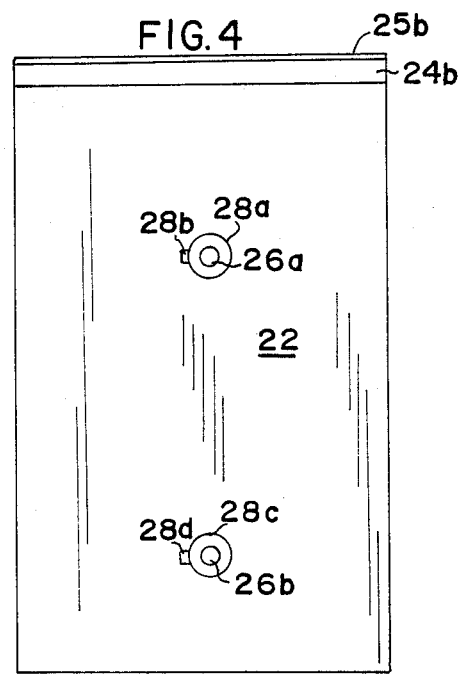

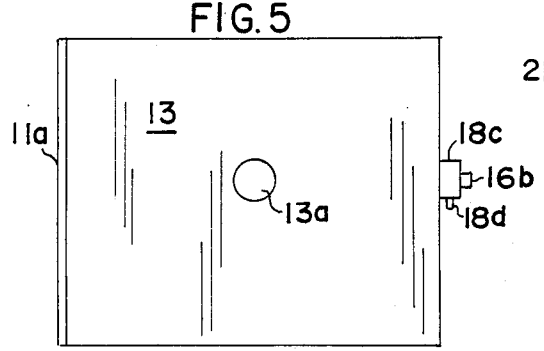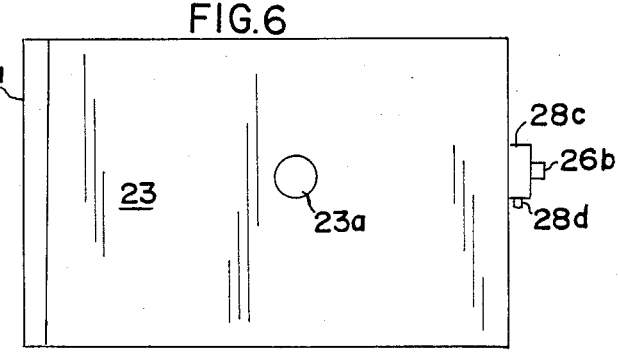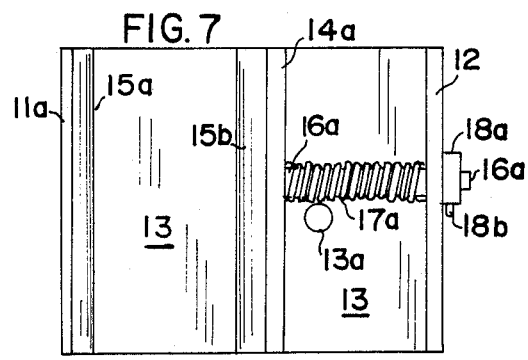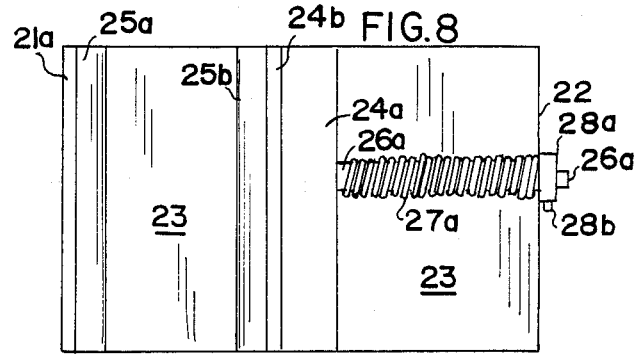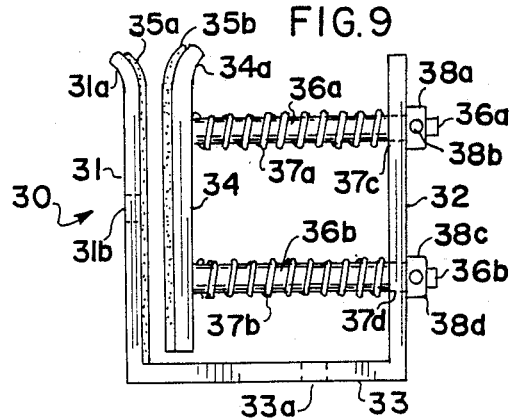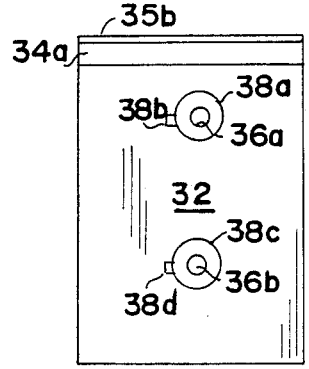

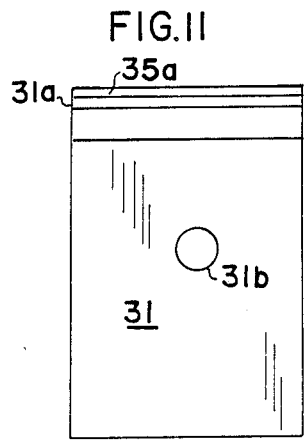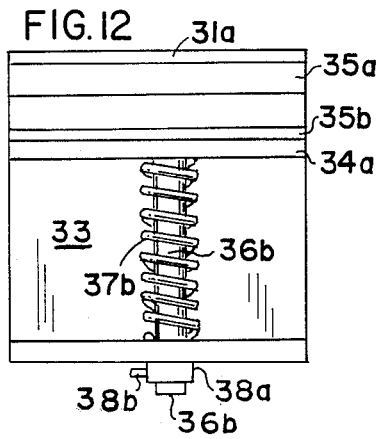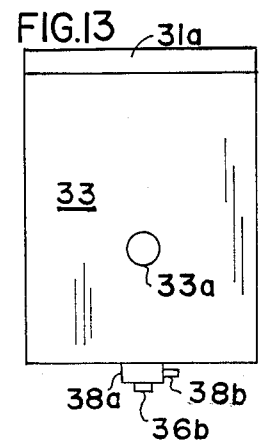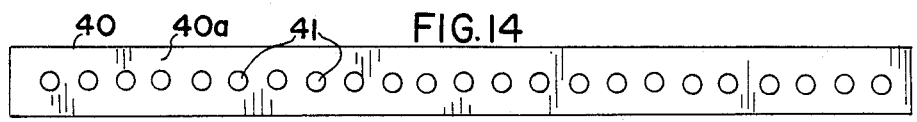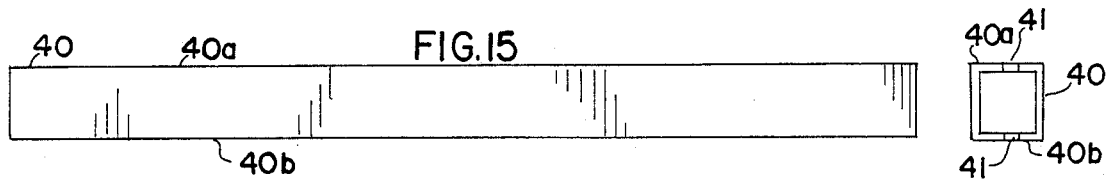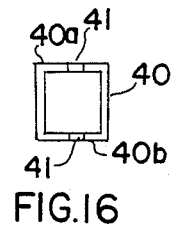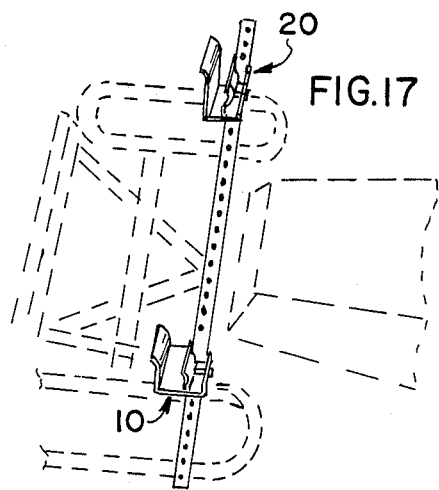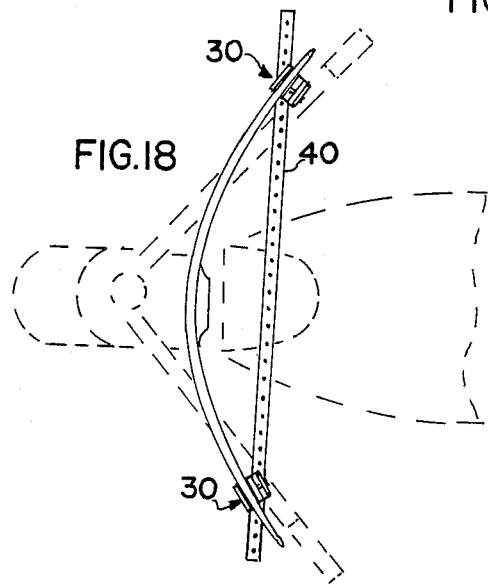

BOW AND GUN HOLDERS FOR OFFROAD VEHICLES

FIELD OF INVENTION

The present invention is in the field of supports or racks for hunting weapons, be they guns or bows. More specifically, it is in the field of bow and gun holders specifically relating to mounting on vehicles for offroad travel which are not customary automotive types.

BACKGROUND OF THE INVENTION

Those who are interested in hunting, be it by bow or by gun, find that the means to support these weapons within their vehicles are relegated to using what can be basically called just simply U-shaped hangers which are mounted on the rear windows of their trucks primarily. For those hunters who use the offroad automotive vehicles normally referred to as ATV or all-terrain vehicles or motorcycles, there has not been a means for carrying a weapon such as bow or a gun on the vehicle while they are traversing the terrain in which they hope to accomplish the hunt.

SUMMARY OF THE PRESENT INVENTION

The present invention provides clamping means which can be attached to the handle bars of the ATV or a motorcycle and which will hold a bow or a rifle or shotgun. The present invention comprises pairs of spring-biased U-shaped clamps which can be positioned on a mounting bar, the bar being secured to the handle bars of the ATV or motorcycle or depending on the construction of the rear portion of the ATV or the motorcycle's rear framework thereof, the U-shaped clamps being positioned on the bar in an adjustable manner to accommodate the length of the bow and/or of the weapon to be employed.

BRIEF DESCRIPTION OF THE DRAWINGS

The present invention can be seen in the accompanying drawings in illustrative modes in the preferred embodiment shown therein.

FIG. 1 is an elevation view of the clamping unit for the butt end of a rifle or shotgun.

FIG. 2 is an elevation view of the clamping unit for the present invention to hold the forearm portion of the rifle or shotgun.

FIG. 3 is a left elevation view of the holding element shown in FIG. 1.

FIG. 4 is a right elevation view of the holding element shown in FIG. 1.

FIG. 5 is a bottom plan view of the element shown in FIG. 1.

FIG. 6 is a bottom plan view of the element shown in FIG. 2.

FIG. 7 is a top plan view of the element shown in FIG. 1.

FIG. 8 is a top plan view of the element shown in FIG. 2.

FIG. 9 is a front elevation view of the element for holding a bow.

FIG. 10 is a right elevation view of the element for holding a bow seen in FIG. 9.

FIG. 11 is a left end view of the bow holding element seen in FIG. 9.

FIG. 12 is a top elevation view of the bow holding element seen in FIG. 9.

FIG. 13 is a bottom plan view of the bow holding element seen in FIG. 9.

FIG. 14 is a top plan view of the mounting bar employed with the present invention, the bottom plan view being substantially identical.

FIG. 15 is a side elevation view of the bar holding element seen in FIG. 14.

FIG. 16 is an end elevation view of the bar holding element seen in FIG. 14.

FIG. 17 is a perspective view of the employment of the present invention mounted on the rear frame of an ATV.

FIG. 18 is a plan view of the bar holding element of the present invention showing its employment with the use of a bow.

DETAILED DESCRIPTION OF THE INVENTION

Referring now to FIGS. 1–8, FIG. 1 discloses the holder for the butt of a rifle or a shotgun. It seems to comprise a generally U-shaped element having a back plate 11, a front plate 12, and a butt holding plate 14. The inner surface of back plate 12 is covered with a non-marring, cushioning layer 15a. The surface of the plate 14 facing the back plate 11 is covered in a similar manner with a cushioning or non-marring material 15b. It is also to be noted that back plate 11 has its upper end curved outwardly as shown at 11a and the holding plate 14 has a similarly outwardly curved tip 14a. It is to be noted that plate 14 is in a sense suspended within the U-shaped frame 10 by means of shafts 16a and 16b which are welded at their contact with plate 14. Shafts 16a and 16b pass through openings 16c and 16d respectively, in front plate 12 and are held in position by stop nut 18a and 18c which have screws 18b and 18d respectively, for tightening them about the protruding ends of shafts 16a and 16b. The purpose of utilizing stop nuts is to permit the substitution of springs 17a and 17b of varying stiffness depending upon the width of the butt of the weapon to be held therein. The bracket 10 has a bottom plate 13 in which there is an aperture 13a to permit the bracket to be attached to a subsequently-to-be-described holding bar. Back plate 11 also has an aperture 11b which would permit the mounting of the bracket 10 on a vertical element. While the brackets of the present invention have been primarily designed for utilization with the ATV or motorcycle as previously described, the brackets may also be mounted within the cab of a vehicle having a suitable vertical mounting element.

FIG. 2 discloses bracket 20 for holding the forearm of a rifle or shotgun. Again, it is comprised of a back plate 21, a front plate 22, a bottom plate 23, and a biased holding plate 24. It is to be noted that again as with the bracket in FIG. 1 the inner surface of back plate 21 is covered with a resilient non-marring material 25a and the holding plate 24 is similarly provided on the surface facing the back plate 21 with absorbent resilient non-marring material 25b. It is also to be noted that back plate 21 has its upper end curved outwardly as shown at 21a and the holding plate 24 has a similarly outwardly curved tip 24b. These outward curvings of back plates 21 and holding plate 24 facilitate the insertion and removal of the forearm of the weapon. It is to be noted that holding plate 24 has an arcuate formation 24a which corresponds generally to the forearm of a rifle or shotgun. Holding plate 24 is positioned within bracket 20 by means of shafts 26a and 26b, one end of each being welded to the holding plate 24. The shafts 26a and 26b pass through the openings 26c and 26d respectively, in front plate 22 and are held in position by stop nuts 28a and 28c respectively, which have screws 28b and 28d respectively inserted therein for the purpose of tightening the stop nuts on the shafts. Whatever reasons cited with reference to the bracket for holding the weapon, the use of stop nuts permits changing the strength of the springs 27a and 27b which encompass shafts 26a and 26b between the front plate 22 and the holding plate 24. As with bracket 10, bracket 20 is provided with an aperture 23a in bottom plate 23 for the purpose of securing bracket 22 to the aforementioned holding bar. To permit mounting of the bracket 20 on a vertical means within the cab of a vehicle, there is provided an aperture 21b.

The brackets for holding a bow can be seen in FIGS. 9-13. It would be apparent to one of knowledge of the art of archery that the brackets would be identical and these are typified in the aforementioned FIGS. 9-13. It would be seen that each bracket 30 comprises a back plate 31, a front plate 32, a bottom plate 33, and a holding plate 34. Back plate 31 has an outwardly curved upper portion 31a. The inner surface of back plate 31 is covered with a resilient non-marring material 35a. Similarly, the surface of holding plate 34 facing the back plate 31 is covered with an identical resilient non-marring material 35b and holding plate 34 has an outwardly curved upper portion 34a. The outward curving of portions 31a and 34a facilitate the insertion and removal of the portion of the bow to be held therein. Holding plate 34 has a pair of shafts 36a and 36b welded thereto and extending through apertures 37c and 37d respectively, in front plate 32 and are held in position by stop nuts 38a and 38c each of which has a tightening screw 38b and 38d respectively. The use of the stop nuts 38a and 38c allows for substitution of springs 37a and 37b of varying resistance depending upon the thickness of the bow element to be placed between the holding plate 34 and the back plate 31. For the purpose of mounting bracket 30 on the back wall of a vehicle, there is provided an aperature 31b. For securing the bracket 30 to the aforementioned holding bar, there is provided an aperture 33a in bottom plate 33.

For mounting the brackets 10 and 20 as well as the brackets 30 on an ATV or motorcycle, there is provided a rectangular tube 40 having an upper surface 40a and a bottom surface 40b, each surface 40a and 40b having therein a plurality of apertures 41 through which appropriate mounting bolts may be passed for securing the tube 40 to the appropriate ATV or motorcycle. While the tube 40 is primarily intended for employment with an ATV or motorcycle, it will be recognized that the tube can also be mounted within the cab of a vehicle utilizing apertures 41 for such mounting and also for mounting the brackets 10, 20 and 30.

It will be readily apparent that the holding plates 14, 24 and 34 are suspended within their respective brackets 10, 20 and 30 by their respective shafts 16a, 16b, 26a, 26b, 36a and 36b. The insertion of a rifle or shotgun within brackets 10 and 20 or a bow within brackets 30 will cause displacement of the respective holding plates 14, 24 and 34 toward their respective front plates 12, 22 and 32, compressing the respective springs 17a, 17b, 27a, 27b, 37a and 37b which by their resilience will hold their respective weapon firmly within the bracket despite the movement of the ATV or the motorcycle.

It will be apparent to those of skill in the art that such modifications as may occur to them in the structure of the disclosed invention will fall within the scope of the following claims.

What I claim is:

1. A device for holding a rifle or shotgun having a butt portion and a forearm portion in a firmly mounted position on an ATV or motorcycle comprising a pair of brackets and a horizontal bar upon which the brackets are mounted, the bar including means adapted to be mounted upon appropriate portions of the ATV or motorcycle, the first of said brackets comprising a U-shaped member having a back plate, front plate, and bottom plate, bridging said front and back plates and a holding plate substantially parallel to the back plate and front plate and suspended therebetween by a pair of spring-biased shafts connected thereto and passing through apertures in said front plate and terminating in locking means on the exterior of the said front plate of a second of said brackets comprising a U-shaped member having a back plate, and a front plate and a bottom plate bridging said front and bottom plates and a holding plate which is configured in it lower portion to correspond to the configuration of the forearm of the weapon placed therein, said holding plate being suspended between said front and back plates by pair of shafts connected thereto and passing through apertures in said front plate and terminating in locking means on the exterior of said front plate, the shafts being encompassed by compressible springs, said horizontal bar having apertures therethrough located along the length thereof, the brackets having apertures on the bottom plates thereof, said horizontal bar having apertures for a attaching said first and second brackets to said horizontal holding bar which in turn is attachable to a respective portion of the ATV or motorcycle.

2. The device according to claim 1 wherein the opposing inner surfaces of said back plate and said holding plate are covered with a resilient, non-marring material.

3. The device according to claim 1 wherein the upper portions of said back plate and said holding plate are respectively turned outwardly to facilitate the receiving of a weapon to be placed therein.

4. The device according to claim 1 wherein the back plate of each aforesaid bracket has an aperture to permit the mounting of the respective brackets within the cab of a vehicle.

5. The device according to claim 1 wherein said horizontal bar comprises a horizontal tube of a plurality of matching openings of its upper and bottom surfaces.

6. A device for holding an archery bow on an ATV or motorcycle comprising a pair of identical brackets and a bar attachable to said vehicles to which said brackets are secured, each of said brackets comprising a U-shaped element and having a front plate, a back plate, a bottom plate bridging said front and back plate and a holding plate, said back plate and said holding plate being substantially parallel, said holding plate being suspended within said bracket on a pair of spring-biased shafts connected thereto and extending through apertures in said front plate and secured thereon by respective holding means, the opposing faces of said back plate and said holding plate being covered with a resilient, non-marring material.

7. The device according to claim 6 wherein the bar upon which said brackets are mounted comprises a horizontal tube having a plurality of matching apertures through its upper and bottom surfaces.

8. The device according to claim 6 wherein each bracket has an aperture in its bottom plate for securely mounting the bracket on said holding bar.

9. The device according to claim 6 wherein each back plate has an aperture therethrough for mounting said bracket in a vertical position on the interior of a vehicle.

* * * * *